March 13, 1962 G. E. TOWNSEND 3,024,778
FUEL MIXTURE HEATER FOR AUTOMOBILES
Filed July 6, 1959
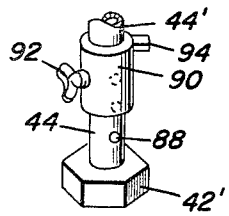
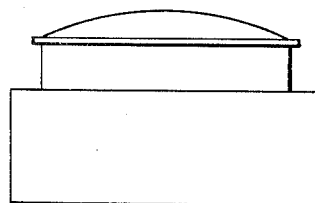
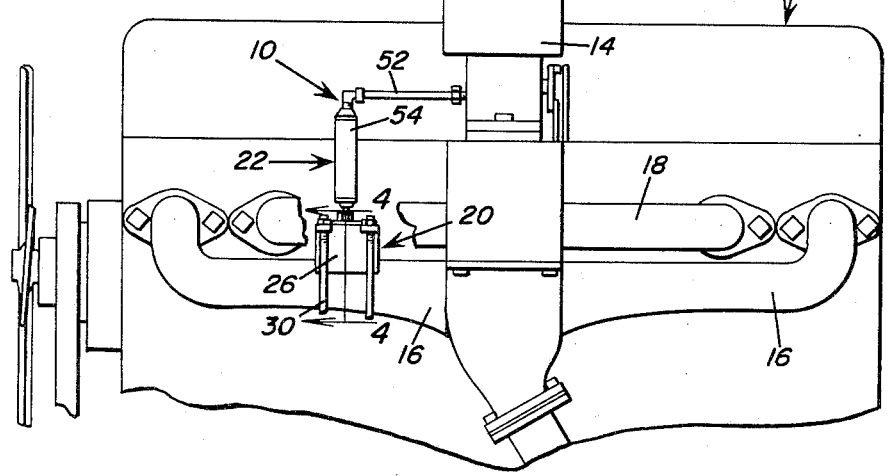
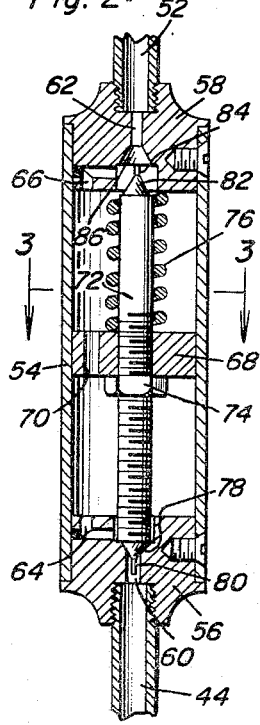
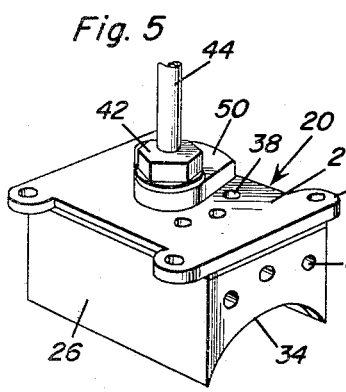
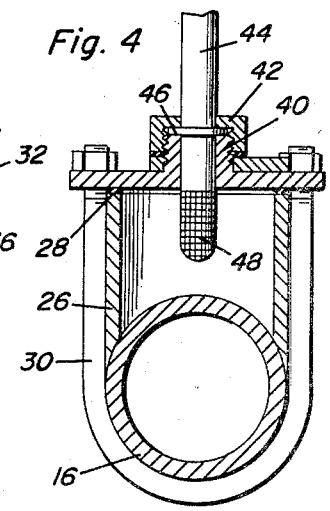
George E. Townsend
INVENTOR.

United States Patent Office 3,024,778
Patented Mar. 13, 1962

1

3,024,778
FUEL MIXTURE HEATER FOR AUTOMOBILES
George E. Townsend, Box 847, Red Bank, N.J.
Filed July 6, 1959, Ser. No. 825,329
5 Claims. (Cl. 123—122)

The present invention generally relates to a heating device or energizing device and more particularly to such a device for use in association with an internal combustion engine for increasing the efficiency of use of the gasoline by employing some of the heat of combustion which is normally exhausted for heating the incoming fuel charge or combustible mixture for more effective atomization of such a fuel charge.

The present invention has for its primary purpose the provision of a heating device for a fuel and air mixture which heating device is controlled by the vacuum in the intake manifold of the engine which enables the device to be accurately controlled since the vacuum in the intake manifold will vary in proportion to the rotational speed of the engine and the setting of the throttle valve.

Another important object of the present invention is to provide a heating device for the incoming fuel charge which is extremely simple in construction in that it has only one moving part and which is adjustable initially to set the device for the particular engine after which the device will operate automatically with it only being necessary for a simple adjustment to be made for optimum efficiency in winter or summer driving conditions.

Yet another object of the present invention is to provide a heating device which employs fresh outside air heated by contact with the hot exhaust manifold and discharged into the intake manifold just inwardly of the carburetor for heating the incoming fuel and air charge which rapidly and more effectively breaks up the incoming fuel charge for more effective volatilization and atomization.

These together with other objects and advantages which will become subsequently apparent reside in the details of construction and operation as more fully hereinafter described and claimed, reference being had to the accompanying drawings forming a part hereof, wherein like numerals to like parts throughout, and in which:

FIGURE 1 is a side elevational view of the present invention mounted on an internal combustion engine shown schematically;

FIGURE 2 is a vertical sectional view taken substantially through the longitudinal center of the heating control devices;

FIGURE 3 is a transverse sectional view taken substantially upon a plane passing along section line 3—3 of FIGURE 2 illustrating the details of construction of the control device;

FIGURE 4 is a detail sectional view taken substantially upon a plane passing along section line 4—4 of FIGURE 1 illustrating the manner of attachment of the heating device to the exhaust manifold;

FIGURE 5 is a perspective view of the heating device; and

FIGURE 6 is a partial perspective view of a modified air control.

Referring now specifically to the drawings, the numeral 10 generally designates the fuel mixture heater and control device therefor of the present invention which is associated with an internal combustion engine generally designated by the numeral 12 and equipped with the usual carburetor 14, an exhaust manifold 16 and intake manifold 18 with the device being broken into two separate assemblies, one of the assemblies being an attachment 20 for attachment to the exhaust manifold 16 and the other being a control for controlling the flow of heated air to the carburetor or intake manifold just below the carburetor which is designated in general by the numeral 22.

Referring specifically first to FIGURES 4 and 5, the heating device 20 includes an attachment for the exhaust manifold 16 which requires no alteration of the exhaust manifold 16 and includes a generally horizontally disposed rectangular plate 24 having a depending peripheral wall 26 extending downwardly therefrom and which may be integral therewith or secured thereto as by a seal 28 in sealing relation. A pair of U-bolts 30 extend under the exhaust manifold 16 and upwardly through ears 32 on the plate 24 thereby rigidly securing the attachment 20 to the exhaust manifold. The lower ends of the end walls of the depending wall 26 are arcuately cut out as indicated by the numeral 34 for conforming with and engaging the upper surface of the exhaust manifold 16 whereby the heat from the exhaust manifold 16 will pass into the interior of the wall 26.

The end walls or at least one end wall is provided with a plurality of openings 36 for admitting air into the interior of the attachment and the top wall 24 is also provided with a plurality of apertures 38 for admitting air into the interior of the attachment. The center of the plate 24 is provided with an upstanding projection or adapter 40 which receives a retaining nut 42 with a tube or tubular member 44 extending therethrough. The tubular member 44 may be provided with a flange 46 capturable between the adapter 40 and the nut 42. The lower or inner end of the tube 44 is provided with a screened inlet 48 which takes the heated air from the interior of the attachment 20 and discharges it through the tube 44 into the control device 22. The vacuum in the intake manifold and the lower end of the carburetor pulls the air in through the openings 36 and 38d and all of the openings 36 and 38 are left open in summertime when the atmosphere is usually warmer and when the incoming fuel charge is usually warmer. However, when it is desired to close off some of the apertures, an arcuate plate 50 is provided for this purpose which is received under the nut 42 and clamped into position by the 42. However, the plate 50 may be swung from the position illustrated in FIGURE 5 to a position overlying one or more of the openings 38 thus closing all of these openings and restricting the air flow to flow through only the openings 36 or those openings 38 left open so that a lesser volume of air will flow through the body so that the air will be heated to a higher temperature level which is desirable during cold driving conditions.

The control device 22 has the tube 44 connected to one end thereof and a tube 52 connected to the other end thereof with the tube 52 extending into the intake manifold or the lower end of the carburetor where it enters into the intake manifold so that the hot air or heated air passing through the control device 22 will heat the incoming fuel and air mixture as it enters into the intake manifold from the carburetor.

The control device 22 includes a cylindrical housing 54 having an end plug 56 at one end and an end plug 58 at the other end. The end plug 56 is provided with a longitudinal passageway 60 while the end plug 58 is provided with a longitudinal passageway 62. The incoming tube 44 is attached to the internally threaded outer end of the passageway 60 while the exhaust or outlet tube 52 is screw threadedly attached to the screw threaded outer end portion of the passageway 62.

The end plug or body 56 is provided with an angulated passageway 64 communicating with the central portion of the passageway 60 and the end plug or body 58 is provided with an angulated passageway 66 communicating with the longitudinal passageway 62, with the inner ends of the passageways 64 and 66 communicating with the interior of the central portion of the housing 54.

Slidably disposed within the housing 54 is a circular disk or piston 68 which has a plurality of apertures 70 extending therethrough. The disk 68 is screw threadedly mounted on an elongated shaft or valve member 72 with a lock nut 74 being provided for locking the disk valve or piston 68 in longitudinally adjusted position on the shaft or stem 72. A compression coil spring 76 encircles the stem or shaft 72 with one end abutting the piston 68 and the other end abutting the body or plug 58 thus urging the piston or disk 68 downwardly as illustrated in FIGURE 2 which means that the shaft or stem 72 is urged towards the body or end plug 56.

The lower end of the stem or shaft 72 is provided with a conical surface forming a valve member 78 and a longitudinally projection 80 of reduced diameter. The other end of the stem or shaft 72 is provided with a conical surface 82 and a projecting longitudinal portion 84 with the conical surfaces 78 and 82 engaging valve seat 86 disposed in the passageway 62 beyond by-pass 64.

The present invention is entirely safe in operation in that no fuel reaches the device. It is well known that excess gasoline accumulates in the intake manifold and is discharged into the cylinders which gasoline washes away the lubrication and causes wear. This excess fuel eventually gets into the oil in the crankcase and causes dilution of the oil thus reducing the lubrication qualities of the oil. The speed of the fuel entering the intake manifold varies from 5 to 15 m.p.m. depending upon the rotational speed of the motor and setting of the throttle valve. Also, it is well known that the exhaust manifold quite often attains a very high temperature and the present invention utilizes this high temperature caused by wasted heat for increasing the temperature within the intake manifold and of the incoming combustible mixture.

The quantity of air heated by the attachment 20 is controlled by the number of openings that are open for admitting ambient air into the attachment. The temperature of the air discharged from the attachment 20 is approximately 150° to 200° F. The screen filter 48 protects the device from dirt or from any foreign airborne particles. Also, the tube 44 may be copper which, by conduction becomes heated and in turn heats the air passing to the control device 22. The tube 44 enters the passageway 62 in the plug 56 and communicates with the interior of the housing 54 through by-pass 64. The valve member 78, which is normally closed, forms a closure for by-pass 64 when the vacuum in the intake manifold is low. Increase in the vacuum in the manifold will pull the shaft 72 to an open position thereby permitting flow of heated air through the piston 68, through the by-pass 66 and into the tube 52. The piston 68 moves in response to variation in the vacuum changes in the intake manifold. The heated air passes into the intake manifold below the throttle of the carburetor. The cylinder or housing which encloses the working parts of the device also serves as a reservoir of heated air and increases the velocity of the heated air with the result of the device performing to reduce smoking and fumes with no overheating of the motor due to the improved combustion. The metering shaft is such that it gives an instant supply of heated air and the controlled ends are constructed to give an idling motor a reduced quantity of heated air that is bypassed due to the performance of the device.

FIGURE 6 illustrates a modified form of the air inlet in which the tube 44' is provided with a plurality of spaced openings 88 and a sliding sleeve 90 is provided for selectively opening and closing the openings 88. The sleeve 90 is held in place by a suitable setscrew 92 and has a tab 94 forming a manipulating handle. Another form of the device involves the use of a rotary sleeve for selectively opening and closing the openings.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An attachment for an internal combustion engine having an exhaust manifold, an intake manifold and a carburetor for supplying a combustible fuel mixture to the intake manifold comprising a heating device for supplying a controlled high velocity heated air to the incoming combustible fuel mixture between the carburetor and intake manifold, said heating device including a tube communicating with the intake manifold inwardly of the carburetor throttle valve, a heated air supplying attachment adapted to be attached to the exhaust manifold, and means intermediate the tube and the exhaust manifold attachment for controlling flow of heated air into the intake manifold, said attachment comprising a downwardly opening compartment mounted on the exhaust manifold, air inlets in said compartment for receiving air for heating by the exhaust manifold, and means rigidly securing the compartment to the exhaust manifold, said air inlet apertures including a plurality of apertures on the ends and a plurality of apertures on the top of the compartment, and a closure plate for selectively closing certain of said apertures.

2. The structure as defined in claim 1 wherein said means includes a pair of U-shaped bolts, said compartment including a lower edge conforming to the surface of the exhaust manifold for rigid engagement therewith.

3. The structure as defined in claim 1 wherein said tube extends into the top of the compartment and is provided with a screened intake for preventing intake of foreign particles into the heated air tube.

4. The combination of claim 1 wherein said control means includes a hollow cylindrical housing having an end plug in each end thereof, each end plug having a longitudinal passageway therein, said passageways being communicated with a tube leading from the attachment for the manifold and a tube leading from the intake manifold, each of said plugs including an angulated passageway therein forming a bypass for the longitudinal passageway, an elongated shaft mounted in said housing and disposed intermediate said plugs with the shaft having a disk-like piston mounted thereon and slidable in the housing, said piston having a plurality of apertures therethrough, spring means urging the piston and shaft towards the end of the housing disposed adjacent the exhaust manifold, said shaft having tapered valve forming conical portions on each end thereof for selectively closing and opening the angulated passageways in the end plugs for automatically controlling the flow of heated air into the intake manifold in response to the vacuum changes in the intake manifold.

5. An attachment for an internal combustion engine having an exhaust manifold, an intake manifold and a carburetor for supplying a combustible fuel mixture to the intake manifold comprising a heating device for supplying a controlled high velocity heated air to the incoming combustible fuel mixture between the carburetor and intake manifold, said heating device including a tube communicating with the intake manifold inwardly of the carburetor throttle valve, a heated air supplying attachment adapted to be attached to the exhaust manifold, and means intermediate the tube and the exhaust manifold attachment for controlling flow of heated air into the intake manifold, said attachment comprising a downwardly opening compartment mounted on the exhaust manifold, air inlets in said compartment for receiving air for heating by the exhaust manifold, and means rigidly securing the compartment to the exhaust manifold, said tube being provided with a plurality of openings therein, a movable sleeve on the tube for selectively closing and opening the openings.

References Cited in the file of this patent

UNITED STATES PATENTS

| | | |
|---|---|---|
| 1,115,745 | Sibley | Nov. 3, 1914 |
| 1,222,548 | Lamar | Apr. 10, 1917 |
| 1,226,107 | Neville | May 15, 1917 |
| 1,320,630 | Lundy | Nov. 4, 1919 |
| 1,333,558 | Minor | Mar. 9, 1920 |
| 1,457,043 | Schramm | May 29, 1923 |
| 1,776,762 | Turner | Sept. 23, 1930 |
| 1,968,214 | Lonskey | July 31, 1934 |
| 2,846,989 | Eskew | Aug. 12, 1958 |